(12) United States Patent
Hattori et al.

(10) Patent No.: US 9,514,776 B2
(45) Date of Patent: *Dec. 6, 2016

(54) METHOD OF MANUFACTURING HEXAGONAL FERRITE MAGNETIC PARTICLES, METHOD OF MANUFACTURING MAGNETIC COATING MATERIAL, AND METHOD OF MANUFACTURING MAGNETIC RECORDING MEDIUM

(71) Applicant: FUJIFILM Corporation, Minato-ku, Tokyo (JP)

(72) Inventors: Yasushi Hattori, Minami-ashigara (JP); Kazufumi Omura, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 63 days.

This patent is subject to a terminal disclaimer.

(21) Appl. No.: 14/093,884

(22) Filed: Dec. 2, 2013

(65) Prior Publication Data
US 2014/0151595 A1 Jun. 5, 2014

(30) Foreign Application Priority Data

Nov. 30, 2012 (JP) ................................ 2012-262843
Apr. 30, 2013 (JP) ................................ 2013-095292
Nov. 26, 2013 (JP) ................................ 2013-244278

(51) Int. Cl.
*C01G 49/00* (2006.01)
*H01F 1/34* (2006.01)
*H01F 1/36* (2006.01)
*H01F 1/11* (2006.01)
*G11B 5/706* (2006.01)

(52) U.S. Cl.
CPC ....... *G11B 5/70678* (2013.01); *C01G 49/0036* (2013.01); *H01F 1/11* (2013.01); *C01P 2002/76* (2013.01); *C01P 2004/64* (2013.01); *C01P 2006/42* (2013.01)

(58) Field of Classification Search
CPC . C01G 49/0036; C01G 49/0018; C01G 49/02; C01G 49/06; H01F 1/11; H01F 1/0054; H01F 1/01; H01F 1/15333; H01F 1/348; H01F 1/36; C01P 2004/64; C01P 2006/42; C01P 2004/84; Y10S 428/90; B82Y 25/00
USPC . 252/62.51 R, 62.63; 428/402, 403; 264/611
See application file for complete search history.

(56) References Cited

U.S. PATENT DOCUMENTS

| | | | | |
|---|---|---|---|---|
| 4,778,734 A | * | 10/1988 | Ohdan | C04B 35/2633 252/62.59 |
| 4,786,430 A | * | 11/1988 | Mair | C01G 1/00 252/62.58 |
| 5,246,609 A | * | 9/1993 | Nakata | G11B 5/70678 252/62.58 |
| 8,072,365 B2 | * | 12/2011 | Ohkoshi | B82Y 30/00 252/62.51 R |
| 2003/0077382 A1 | | 4/2003 | Hong et al. | |
| 2010/0238063 A1 | | 9/2010 | Ohkoshi et al. | |
| 2011/0244272 A1 | * | 10/2011 | Suzuki | B82Y 30/00 428/842.8 |
| 2012/0003503 A1 | | 1/2012 | Mori | |

FOREIGN PATENT DOCUMENTS

| | | | |
|---|---|---|---|
| JP | 62-241827 A | | 10/1987 |
| JP | 06088795 B2 | * | 11/1994 |
| JP | 7-172839 A | | 7/1995 |
| JP | 2007-91517 A | | 4/2007 |
| JP | 2008-063201 A | | 3/2008 |
| JP | 2008-277726 A | | 11/2008 |
| JP | 2010-1171 A | | 1/2010 |
| JP | 2012-014809 A | | 1/2012 |

OTHER PUBLICATIONS

Machine translation of JP06088795B2, printed Apr. 13, 2016, 5 pages.*
Office Action dated Jun. 2, 2015 in counterpart Japanese Application No. 2013-244278.
Office Action dated Aug. 18, 2015, from the Japanese Patent Office in counterpart Japanese Application No. 2013-244278.

* cited by examiner

*Primary Examiner* — Matthew E Hoban
*Assistant Examiner* — Lynne Edmondson
(74) *Attorney, Agent, or Firm* — Sughrue Mion, PLLC

(57) ABSTRACT

The method of manufacturing hexagonal ferrite magnetic particles includes providing hexagonal ferrite magnetic particles by conducting calcination of particles comprising an iron salt and an alkaline earth metal salt to cause fertilization; and further includes preparing the particles comprising an iron salt and an alkaline earth metal salt by adhering a glass component, followed by the alkaline earth metal salt, to the iron salt; and conducting calcination of the particles prepared to form a calcined product in which hexagonal ferrite is detected as a principal component in X-ray diffraction analysis.

13 Claims, No Drawings

METHOD OF MANUFACTURING HEXAGONAL FERRITE MAGNETIC PARTICLES, METHOD OF MANUFACTURING MAGNETIC COATING MATERIAL, AND METHOD OF MANUFACTURING MAGNETIC RECORDING MEDIUM

CROSS-REFERENCE TO RELATED APPLICATIONS

This application claims the benefit of priority under 35 USC 119 to Japanese Patent Application No. 2012-262843 filed on Nov. 30, 2012 Japanese Patent Application No. 2013-095292 filed on Apr. 30, 2013, and Japanese Patent Application No. 2013-244278 filed on Nov. 26, 2013, which are expressly incorporated herein by reference in their entirety.

BACKGROUND OF THE INVENTION

1. Field of the Invention

The present invention relates to a method of manufacturing hexagonal ferrite magnetic particles and to the hexagonal ferrite magnetic particles obtained by the above method. More particularly, the present invention relates to a method of manufacturing hexagonal ferrite magnetic particles making it possible to provide microparticles by inhibiting the aggregation of particles in a step of fertilization by calcination, and to the hexagonal ferrite magnetic particles obtained by the above method.

The present invention further relates to usage of the above manufacturing method and hexagonal ferrite magnetic particles.

2. Discussion of the Background

Hexagonal ferrite is employed in permanent magnets. In addition, it has also been employed as a magnetic material in magnetic recording media in recent years.

The method (coprecipitation method) of fertilization by conducting calcination of a coprecipitate obtained by coprecipitating an iron salt and an alkaline earth metal salt is a known method of manufacturing hexagonal ferrite (see Japanese Unexamined Patent Publications (KOKAI) Heisei No. 7-172839 and No. 2010-1171, which are expressly incorporated herein by reference in their entirety). The method of obtaining a coprecipitate by forming a reverse micelle (reverse micelle method) has been proposed as an improved coprecipitation method (see Japanese Unexamined Patent Publication (KOKAI) No. 2007-91517, which is expressly incorporated herein by reference in its entirety). The application of the reverse micelle method to the manufacturing of ∈-iron oxide, employed as an electromagnetic wave absorber, is proposed in Japanese Unexamined Patent Publication (KOKAI) No. 2008-277726 or English language family member US2010/238063A1 and U.S. Pat. No. 8,072,365, which are expressly incorporated herein by reference in their entirety.

US2003/0077382A1, which is expressly incorporated herein by reference in its entirety, describes that spherical ferrite particles can be obtained by adhering barium or strontium carbonate to iron oxide or iron hydroxide and then conducting calcination.

As the volume of information being recorded has grown, ever higher density recording on magnetic recording media has been demanded. Reducing the size of magnetic material is necessary to achieve higher recording densities. In the coprecipitation and reverse micelle methods, there is a problem in that the particles sinter and aggregate during calcination, making it difficult to achieve minute particles.

The method described in US2003/0077382A1 presents this same problem because calcination is conducted to produce ferrite.

With regard to the above, Japanese Unexamined Patent Publication (KOKAI) No. 2007-91517 proposes that sintering be inhibited by coating the coprecipitate with an alkaline earth metal compound before calcination. However, based on investigation by the present inventors, the anti-sintering effect achieved with an alkaline earth metal compound is not necessarily adequate. Achieving higher density recording requires more effective means for preventing sintering.

SUMMARY OF THE INVENTION

An aspect of the present invention provides for means for manufacturing microparticulate hexagonal ferrite magnetic particles.

The present inventors conducted extensive research. As a result, they discovered that in the course of obtaining particles containing iron salt and an alkaline earth metal salt (ferrite precursors), adhering a glass component and then the alkaline earth metal salt to the iron salt made it possible to prevent sintering during calcination.

However, in Japanese Unexamined Patent Publication (KOKAI) No. 2008-277726 described above, it is necessary to conduct the oxidation reaction in a silica coating to obtain ∈-iron oxide. Thus a silica coating of a quantity adequate to completely cover the particles is provided. However, when the quantity of the glass component adhering to the iron salt is excessive, hematite ($Fe_2O_3$) formation takes place preferentially over ferrite formation during calcination. As a result, the calcined product was found to end up containing a principal component in the form of hematite, not hexagonal ferrite. This point will be described in greater detail below.

By way of example, barium ferrite magnetic particles can be obtained by conducting calcination of particles containing iron hydroxide and barium carbonate. During calcination, $Fe(OH)_2$ is oxidized, producing FeO; $BaCO_3$ breaks down into BaO and $CO_2$; and the FeO and BaO that are produced combine into barium ferrite.

However, barium carbonate has high affinity for a glass component. Accordingly, in a state where iron hydroxide is completely covered with a glass component, the barium carbonate that has been adhered to the iron hydroxide following the glass component ends up exhibiting affinity for the glass component. Thus, only a small amount of Ba effectively ends up forming ferrite. In addition, the decomposition reaction of $BaCO_3$ depends on the $CO_2$ partial pressure. When the calcined particles are covered with a large quantity of glass component, the decomposition of $BaCO_3$ is inhibited, and the amount of Ba that effectively forms ferrite decreases. Furthermore, when the calcined particles are covered with a large quantity of glass component, the oxygen partial pressure in the ferrite-forming reaction decreases. The synthesis of hexagonal ferrite is known to depend on the oxygen partial pressure. When the oxygen partial pressure is low during calcination, ferrite formation tends not to progress in areas where little Ba for effectively forming ferrite is present.

The above are thought to be the reasons for which the formation of hematite during calcination takes place preferentially when the quantity of glass component covering the iron salt is excessive. Similarly, when conducting calcination of particles comprising other iron salts and alkaline earth metal salts, the reason why the reaction between the alkaline earth metal salt and the iron salt is impeded is presumed to be that ferrite formation does not advance smoothly.

Based on the above knowledge, the present inventors discovered that it was possible to obtain microparticulate hexagonal ferrite magnetic particles by adhering a glass component to an iron salt before the adhesion of an alkaline earth metal salt, and then conducting calcination to obtain a calcined product in which X-ray diffraction analysis following calcination revealed the principal component to be hexagonal ferrite. The present invention was devised on that basis.

An aspect of the present invention relates to a method of manufacturing hexagonal ferrite magnetic particles, which comprises:

providing hexagonal ferrite magnetic particles by conducting calcination of particles comprising an iron salt and an alkaline earth metal salt to cause fertilization;

and further comprises:

preparing the particles comprising an iron salt and an alkaline earth metal salt by adhering a glass component, followed by the alkaline earth metal salt, to the iron salt; and conducting calcination of the particles prepared to form a calcined product in which hexagonal ferrite is detected as a principal component in X-ray diffraction analysis.

In an embodiment, the glass component is a hydrolysate of a silicon compound.

In an embodiment, the silicon compound is an alkoxysilane.

In an embodiment, the above method further comprises preparing the iron salt by a reverse micelle method.

In an embodiment, the above method comprises admixing a precursor of the glass component with a solution comprising the iron salt to cause the glass component, in the form of a hydrolysate of the precursor, to adhere to the iron salt.

In an embodiment, the precursor is added in a quantity ranging from 0.05 to 0.4 mole per 1 mole of iron present in the solution.

In an embodiment, the above method comprises admixing a precursor of the alkaline earth metal salt and an additional component for converting the precursor to the alkaline earth metal salt, with a solution comprising a product obtained by adhering the glass component to the iron salt, to adhere the alkaline earth metal salt to the product.

In an embodiment, ammonia water is added together with the precursor of the alkaline earth metal salt and the additional component.

In an embodiment, the iron salt is iron hydroxide and the alkaline earth metal salt is carbonate of an alkaline earth metal.

In an embodiment, the above method further comprises removing the glass component from a surface of the calcined product.

In an embodiment, the glass component is removed by dissolution with an alkali.

A further aspect of the present invention relates to hexagonal ferrite magnetic particles provided by the above manufacturing method.

In an embodiment, the above hexagonal ferrite magnetic particles have a particle size ranging from 10 to 20 nm.

A further aspect of the present invention relates to magnetic recording magnetic material comprised of the above hexagonal ferrite magnetic particles.

A further aspect of the present invention relates to a magnetic coating material containing an organic solvent and the above hexagonal ferrite magnetic particles.

In an embodiment, the above magnetic coating material comprises a compound having a functional group serving as an anionic group in an aqueous solution.

In an embodiment, the above magnetic coating material further comprises a binder.

In an embodiment, the above magnetic coating material is employed to form a magnetic layer of a magnetic recording medium.

A further aspect of the present invention relates to a method of manufacturing a magnetic coating material, which comprises:

preparing hexagonal ferrite magnetic particles by the above manufacturing method;

washing with water the hexagonal ferrite magnetic particles that have been prepared; and during or after the washing with water, adding a compound having a functional group serving as an anionic group in an aqueous solution to an aqueous solution comprising the hexagonal ferrite magnetic particles and causing the compound to adhere to a surface of the hexagonal ferrite magnetic particles.

In an embodiment, the above method further comprises subjecting the aqueous solution comprising the hexagonal ferrite magnetic particles to which the compound is adhered to a solvent replacement treatment to replace a solvent with an organic solvent.

A further aspect of the present invention relates to a method of manufacturing a magnetic recording medium comprising a magnetic layer containing ferromagnetic powder and a binder on a nonmagnetic support, which comprises:

preparing a magnetic coating material by the above method; and forming the magnetic layer with the magnetic coating material prepared.

In an embodiment, the magnetic coating material is prepared by the method which further comprises subjecting the aqueous solution comprising the hexagonal ferrite magnetic particles to which the compound is adhered to a solvent replacement treatment to replace a solvent with an organic solvent.

A further aspect of the present invention relates to a magnetic recording medium comprising a magnetic layer containing ferromagnetic powder and a binder on a nonmagnetic support, wherein the ferromagnetic powder is the above hexagonal ferrite magnetic particles.

In an embodiment, the above magnetic recording medium is a magnetic recording medium prepared by the above method.

An aspect of the present invention makes it possible to provide hexagonal ferrite magnetic particles that are suitable as magnetic material in a magnetic recording medium for high-density recording.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

An aspect of the present invention relates to a method of manufacturing hexagonal ferrite magnetic particles, which comprises:

providing hexagonal ferrite magnetic particles by conducting calcination of particles comprising an iron salt and an alkaline earth metal salt to cause fertilization;

and further comprises:

preparing the particles comprising an iron salt and an alkaline earth metal salt by adhering a glass component, followed by the alkaline earth metal salt, to the iron salt; and conducting calcination of the particles prepared to form a calcined product in which hexagonal ferrite is detected as a principal component in X-ray diffraction analysis.

As set forth above, the method of manufacturing hexagonal ferrite magnetic particles according to an aspect of the present invention can inhibit sintering during calcination, and thus makes it possible to obtain microparticulate hexagonal ferrite magnetic particles.

The method of manufacturing hexagonal ferrite magnetic particles according to an aspect of the present invention will be described in greater detail below.

According to an aspect of the present invention, in the course of calcination of particles containing an iron salt and an alkaline earth metal salt to produce ferrite and thus obtain hexagonal ferrite magnetic particles, the particles containing an iron salt and an alkaline earth metal salt are prepared in the following manner. First, a glass component is adhered to an iron salt. Subsequently, an alkaline earth metal salt is adhered to the iron salt that has been subjected to the adhering treatment of the glass component. The glass component that has been adhered before adhering the alkaline earth metal salt to the iron salt can prevents sintering during calcination to produce ferrite and is thought by the present inventors to be the reason why it is possible to obtain microparticulate hexagonal ferrite magnetic particles according to an aspect of the present invention. By contrast, in the conversion to ferrite that accompanies conventional calcination such as that described in the above-described Japanese Unexamined Patent Publications (KOKAI) Heisei No. 7-172839 and No. 2010-1171, Japanese Unexamined Patent Publication (KOKAI) No. 2007-91517 and US2003/0077382A1, the particles end up sintering during calcination, making it difficult to obtain microparticulate particles.

The iron salt to which the glass component is adhered can be prepared by known methods or a commercial iron salt (such as iron hydroxide, iron oxide, or goethite) can be used.

The reverse micelle method is desirably employed to prepare the iron salt from the perspective of the ease of controlling the particle size. That is, the iron salt is desirably a precipitate obtained by precipitation from a micelle solution by the reverse micelle method. In the reverse micelle method, a surfactant and an organic solvent that is immiscible with water are added to an aqueous solution of a water-soluble salt of iron to form a W/O emulsion, to which an alkali is then added to precipitate out the iron salt. For example, it is possible to control the size of the particles of precipitating iron salt by means of the mixing ratio of the surfactant and water.

Examples of the water-soluble salt are iron nitrate and chloride. Examples of the alkali are sodium hydroxide, potassium hydroxide, sodium carbonate, and ammonia water.

In an aspect of the present invention, the glass component is caused to adhere to the iron salt, as set forth above. Conducting adhesion of the glass component in a solution is desirable because it facilitates adhesion. For example, a precursor of the glass component is admixed to a solution comprising the iron salt to cause the glass component in the form of the hydrolysate of the precursor to adhere to the iron salt. When the iron salt are obtained by the reverse micelle method, the precursor can be added to the solution in which the iron salt has been precipitated and the glass component precipitated onto the iron salt particle surface by the so-called sol-gel method. A silicon compound is an example of a suitable precursor when adhering a glass component to the iron salt. A silane compound such as an alkoxysilane is desirably employed as the silicon compound. Silica ($SiO_2$) can be adhered to the surface of the iron salt particle by hydrolyzing a silane compound. Among these compounds, the use of tetraethyl orthosilicate (TEOS), which permits the formation of silica by the sol-gel method, is desirable.

As set forth above, when the iron salt ends up being completely covered by the glass component, the formation of hematite ends up preferentially occurring over the formation of ferrite during calcination and it becomes difficult to obtain a calcined product in which X-ray diffraction analysis reveals the principal component to be hexagonal ferrite. Accordingly, in an aspect of the present invention, it is desirable to adhere a glass component to the iron salt with a quantity that will yield a calcined product in which X-ray diffraction analysis will reveal the principal component to be hexagonal ferrite. When the glass component is adhered to the iron salt such that a portion of the surface of the iron salt particles remains uncoated, the subsequent reaction (ferrite formation) between the alkaline earth metal salt adhered to the iron salt and the iron salt can advance unimpeded. As a result, it becomes possible to obtain a calcined product in which X-ray diffraction reveals the principal component to be hexagonal ferrite. For example, adding the precursor of the glass component to the solution in a quantity falling within a range of 0.05 to 0.4 mole per mole of iron present in the solution (including that contained in the particles and that contained in the solution) makes it possible to obtain iron salt particles having portions that are not coated with a glass component.

The iron salt to which the glass component is adhered can be washed to remove the uncoated glass component and the precursors thereof, preferably prior to subjecting adhesion of the alkaline earth metal salt. Washing can be conducted with a mixed solvent of water and a primary alcohol, as described in paragraph [0024] of Japanese Unexamined Patent Publication (KOKAI) No. 2007-91517. Washing with other organic solvents can be conducted.

The adhesion treatment with the alkaline earth metal salt is desirably conducted in a solution to facilitate adhesion. For example, the alkaline earth metal salt can be added to a solution in which iron salt particles to which the glass component has been adhered have been dispersed, and made to adhere to the surface of the particles. Alternatively, a precursor of the alkaline earth metal salt can be added to the solution, and the precursor can be converted to the alkaline earth metal salt by a reaction such as salt formation, neutralization, or hydrolysis and caused to adhere to the surface of the iron salt particles. For example, the precursor and additional components for converting the precursor to the alkaline earth metal salt can be admixed to a solution to cause the alkaline earth metal salt to adhere to the iron salt particles to which the glass component has been adhered in the solution. Examples of the additional components are salts that contain an anion component forming a salt with an alkaline earth metal cation and that are capable of forming alkaline earth metal salts of lower solubility in solutions than the anion component contained in the precursor. When conducting the adhesion treatment with an alkaline earth metal salt in an aqueous solution, for example, employing a water-soluble salt in the form of a nitrate or a chloride of an alkaline earth metal as the precursor and employing a carbonate of an alkaline metal as an additional component, it is possible to cause the carbonate of the alkaline earth metal to adhere to the surface of the iron salt particles. From the perspective of getting conversion of the precursor into the alkaline earth metal salt to progress smoothly, the reaction is desirably conducted under alkaline conditions. Examples of the alkali that is added to the solution to achieve alkaline conditions are sodium hydroxide, potassium hydroxide, sodium carbonate, and ammonia water. The use of sodium hydroxide is desirable from the perspective of achieving alkaline conditions with small quantities, and the use of a weak base in the form of ammonia water is suitable from the perspective of little dissolution of the glass component that has been adhered to the iron salt particles. Further, by converting the precursor of the alkaline earth metal salt into an alkali such as a hydroxide in an alkaline solution and then bubbling carbon dioxide in the solution makes it possible to precipitate the alkaline earth metal carbonate and cause it to adhere to the iron salt particles.

Since the alkaline earth metal tends to be picked up by the glass component, it is desirable to add a quantity of alkaline earth metal that is greater than or equal to the stoichiometric composition of hexagonal ferrite, for example, one to five-fold the quantity of the stoichiometric composition calculated from the quantity of iron employed, and preferable to add the alkaline earth metal in a quantity that is 1.5-fold to four-fold the stoichiometric composition. When barium is employed as the alkaline earth metal, barium ferrite can be obtained. When strontium is employed, strontium ferrite can be obtained. And when calcium is employed, calcium ferrite can be obtained.

Examples of optional elements that can constitute hexagonal ferrite along with the iron and the alkaline earth metal are Co, Al, Ti, and Zn. For example, the addition of Ti and Zn can be used to adjust the coercive force. These optional elements can be adhered to the iron salt particles either before or after adhesion of the glass component. For example, hydroxides and carbonates of Co, Al, Ti, and Zn have poor solubility in water, and settle (precipitate) out of aqueous solutions. Thus, these elements can be adhered to the iron salt particles in an aqueous solution in the form of hydroxides or carbonates.

As set forth above, the iron salt that has been sequentially subjected to adhesion treatments with a glass component and alkaline earth metal salt can be subjected as needed to processing to remove it from the solution; clean, dry, and pulverize it; and the like, and then calcined. Pulverization allows calcination to be uniformly conducted and facilitates removal of the glass component after calcination. When goethite is employed as the iron salt, after sequentially adhering the glass component and the alkaline earth metal salt, it is desirable to obtain iron oxide by conducting reduction in a weakly reducing atmosphere such as a hydrogen gas atmosphere, followed by calcination in an oxygen atmosphere.

Calcination can be conducted at a temperature of 500° C. to 1,000° C., for example. Known techniques relating to the manufacturing of hexagonal ferrite, such as the coprecipitation method and the reverse micelle method, can be used for calcination and subsequent steps in an aspect of the present invention.

In an aspect of the present invention, hexagonal ferrite is detected by X-ray diffraction analysis as the principal component of the particles after calcination. The phrase "hexagonal ferrite is detected as the principal component" means that the peak of maximum intensity in the X-ray diffraction spectrum is the peak derived from the crystalline structure of hexagonal ferrite.

The glass component remains on the surface of the particles following calcination. This glass component can be removed or left in place. To enhance the magnetic characteristics of the magnetic particles, it is desirable to remove the glass component. The glass component can be removed by dissolution by, for example, the method of immersing the particles in an alkaline solution such as sodium hydroxide (alkali washing) or hydrofluoric acid (HF). Hydrofluoric acid is not easy to handle, so alkali washing is desirably employed.

The method of manufacturing hexagonal ferrite magnetic particles according to an aspect of the present invention as set forth above can prevents the aggregation of particles due to sintering during calcination, making it possible to obtain microparticulate hexagonal ferrite. For example, an aspect of the present invention makes it possible to obtain microparticulate hexagonal ferrite magnetic particles with a particle size of 10 nm to 20 nm that are suitable as the magnetic material in magnetic recording media for high-density recording.

In the present invention, the particle size is a value measured by the following method.

The particles are photographed at 100,000-fold magnification with a model H-9000 transmission electron microscope made by Hitachi and printed on photographic paper at an overall magnification of 500,000-fold to obtain a particle photograph. The targeted particles are selected in the particle photograph, the contours of the particles are traced with a digitizer, and the particle size is measured with KS-400 Carl Zeiss image analysis software. For the powder comprised of gathering particles, the size of 500 primary particles is measured and the average value of the particle size is adopted as a particle size (average particle size).

In the present invention, the size of the particles or powder of magnetic particles or the like (referred to as the "particle size", hereinafter), (1) is given by the length of the major axis of the particle, that is, the major axis length when the particles are acicular, spindle-shaped, cylindrical in shape (with the height being greater than the maximum major diameter of the bottom surface), or the like; (2) is given by the maximum major diameter of the plate surface or bottom surface when the particles are tabular or cylindrical in shape (with the thickness or height being smaller than the maximum major diameter of the plate surface or bottom surface); and (3) is given by the diameter of a circle of equal perimeter when the particles are spherical, polyhedral, or of indeterminate shape, and the major axis of the particle cannot be specified based on the shape. The term "diameter of a circle of equal perimeter" can be obtained by circular projection.

The average particle size of the particles is the arithmetic average of the above particle size and is obtained by measuring 500 primary particles, as set forth above. The term "primary particle" refers to an independent particle that has not aggregated.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in powder size definition (1) above, the average powder size refers to the average major axis length. For definition (2) above, the average powder size refers to the average plate diameter, with the arithmetic average of (maximum major diameter/thickness or height) being referred to as the average plate ratio. For definition (3), the average powder size refers to the average diameter (also called the average particle diameter).

Shape anisotropy becomes larger for (2), (3), and (1) in this order. From the perspective of preparing microparticles, it is desirable to select the embodiment with which shape anisotropy can be simply increased when an axis of easy magnetization is subjected to in-plane orientation. By contrast, when an axis of easy magnetization is subjected to vertical orientation for vertical recording, a desirable order is (2), (1), and then (3) because it is better to take flow orientation into consideration.

An aspect of the present invention provides hexagonal ferrite magnetic particles that has been provided by the manufacturing method according to an aspect of the present invention.

The hexagonal ferrite magnetic particles according to an aspect of the present invention are obtained by the manufacturing method according to an aspect of the present invention. As a result, for example, it is possible to obtain microparticles with a particle size ranging from 10 to 20 nm. Such microparticulate magnetic powder is suitable as a magnetic material for magnetic recording. With the hexagonal ferrite magnetic particles according to an aspect of the present invention, hexagonal ferrite magnetic particles can be mixed with a binder and a solvent to form a coating liquid, which can then be coated on a support to form a magnetic layer. Accordingly, the hexagonal ferrite magnetic particles according to an aspect of the present invention are suitable for application to particulate magnetic recording media. Therefore, another aspect of the present invention relates to a particulate magnetic recording medium comprising the hexagonal ferrite magnetic particles according to an aspect of the present invention as the ferromagnetic powder in a magnetic layer.

That is, using the hexagonal ferrite magnetic particles according to an aspect of the present invention, it is possible to obtain a magnetic recording medium, having a magnetic layer comprising ferromagnetic powder and a binder on a nonmagnetic support, in which the ferromagnetic powder is comprised of the hexagonal ferrite magnetic particles according to an aspect of the present invention. Accordingly, a further aspect of the present invention relates to a particulate magnetic recording medium containing the hexagonal ferrite magnetic particles according to an aspect of the present invention as the ferromagnetic powder of the magnetic layer.

The above magnetic recording medium can have a multilayer configuration sequentially comprising, on a nonmagnetic support, a nonmagnetic layer containing nonmagnetic powder and a binder, and a magnetic layer containing the magnetic particles according to an aspect of the present invention and a binder, with a backcoat layer on the opposite surface of the nonmagnetic support from the surface on which the magnetic layer is formed. Techniques that are known with regard to magnetic recording media can be applied to manufacture a magnetic recording medium using the hexagonal ferrite magnetic particles according to an aspect of the present invention. Reference can also be made to the description of the method of manufacturing the magnetic recording medium according to of the present invention that is set forth further below.

A further aspect of the present invention relates to a magnetic coating material containing magnetic particles and an organic solvent.

The magnetic coating material according to an aspect of the present invention contains magnetic particles in the form of the hexagonal ferrite magnetic particles obtained by the above-described manufacturing method. It desirably contains a compound having a functional group that serves as an anionic group in an aqueous solution. In the present invention, "aqueous" is used to mean "containing water." The above compound is also referred to as a "dispersing agent", hereinafter.

The compound having a functional group that serves as an anionic group in an aqueous solution can function as a dispersing agent for the hexagonal ferrite magnetic particles in a magnetic coating material comprising an organic solvent. That is because the functional group that serves as an anionic group in an aqueous solution can adsorb to the surface of the magnetic particles, preventing the magnetic particles from aggregating. Accordingly, by incorporating such as compound into the magnetic coating material of according to an aspect of the present invention, it becomes possible to incorporate the hexagonal ferrite that has been obtained by the above-described manufacturing method into an organic solvent in a highly dispersed state. The fact that the magnetic particles are highly dispersed in the magnetic coating material thus obtained renders it suitable as a magnetic layer-forming coating liquid for a particulate magnetic recording medium for which it is desirable to contain magnetic particles in highly dispersed state. Since microparticulate hexagonal ferrite magnetic particles can be obtained by an aspect of the present invention, it is possible to obtain a magnetic coating material that is suitable as a magnetic layer-forming coating liquid for a magnetic recording medium for ultrahigh-density recording by causing the microparticulate hexagonal ferrite magnetic particles that are obtained to be present in a highly dispersed state in the magnetic coating material.

The magnetic coating material according to an aspect of the present invention can also contain a binder in addition to the above components. The magnetic coating material containing a binder is suitable as a magnetic layer-forming coating liquid for a particulate magnetic recording medium. For example, by adding a binder to a solution that has been treated with a dispersing agent as set forth further below, it is possible to obtain a magnetic coating material containing a binder. Reference can be made to the description given further below for details on binders that can be added.

The above compound having a functional group serving as an anionic group in an aqueous solution can be mixed with hexagonal ferrite magnetic particles in an organic solvent. Being present in an aqueous solution as an anionic group can enhance adsorption to the hexagonal ferrite magnetic particle surfaces. Thus, mixing this compound with hexagonal ferrite magnetic particles in an aqueous solution to cause it to adhere to the surface of the hexagonal ferrite magnetic particles is desirable. For example, in the method of manufacturing hexagonal ferrite magnetic particles according to an aspect of the present invention, to conduct the treatment to remove the glass component set forth above, the compound can be added to the aqueous solution during or after the water washing following removal of the glass compound to cause the compound to adhere to the surface of the hexagonal ferrite magnetic particles. The water washing following removal of the glass compound can be conducted with water, or with an aqueous solvent, such as a mixed solvent of water and a water-soluble organic solvent such as methanol, ethanol, acetone, N,N-dimethylformamide, N,N-dimethylacetamide, or tetrahydrofuran.

Following the water washing, the hexagonal ferrite magnetic particles can be recovered by a known solid-liquid separation method from the aqueous solution. The hexagonal ferrite magnetic particles that have been recovered can be subjected to an optional drying treatment as needed. Since the dispersing agent has adhered to the hexagonal ferrite magnetic particles that have been recovered, they can disperse readily in an organic solvent when they are added to an organic solvent. The magnetic coating material according to an aspect of the present invention can be obtained in this manner.

Following the water washing, solvent replacement with an organic solvent by a solvent replacement treatment can yield the magnetic coating material according to an aspect of the present invention. The solvent replacement treatment can be conducted by the known solvent replacement treatment of repeatedly adding an organic solvent and conducting solid-liquid separation. In the solvent replacement treatment, reference can be made to Examples set forth further below. Conducting a solvent replacement treatment without removing the particles from the aqueous solution is desirable to obtain a magnetic coating material in which the hexagonal ferrite magnetic particles are dispersed to a higher degree in the organic solvent.

That is, an aspect of the present invention relates to:
a method of manufacturing a magnetic coating material containing the hexagonal ferrite magnetic particles according to an aspect of the present invention, the above dispersing agent, and an organic solvent, comprising:

preparing the hexagonal ferrite magnetic particles by the manufacturing method according to an aspect of the present invention set forth above;
water washing the hexagonal ferrite magnetic particles that have been prepared; and
either during or after the water washing, adding the above dispersing agent to the aqueous solution containing the hexagonal ferrite magnetic particles and causing the dispersing agent to adhere to the surface of the hexagonal ferrite magnetic particles.

The above method of manufacturing a magnetic coating material desirably further comprises subjecting the aqueous solution containing the hexagonal ferrite magnetic particles to which the dispersion agent has adhered to a solvent replacement treatment to replace the solvent with an organic solvent.

The magnetic coating material according to an aspect of the present invention and the method of manufacturing it will be described in greater detail below.

The following functional groups are specific examples of the above-mentioned functional groups that serve as anionic groups in aqueous solutions.

Sulfur Polar Group

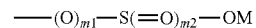

(In the above formula, m1 denotes 0 or 1; m2 denotes 1 or 2; and M denotes a hydrogen atom or an alkali metal atom.)

The above sulfur polar group includes:
sulfonic acid (salt) groups [—S(═O)$_2$ OM];
sulfuric acid (salt) groups [—(O)—S(═O)$_2$OM];
sulfinic acid (salt) groups [—S(═O)OM]; and
sulfurous acid (salt) groups [—(O)—S(═O)OM].

The sulfonic acid (salt) groups are meant to include the sulfonic acid group and its alkali metal salt groups. The same applies to the sulfuric acid (salt) groups and the like.

Carboxylic Acid (Salt) Group

(In the above formula, M denotes a hydrogen atom or an alkali metal atom.)

Phosphorus Polar Group

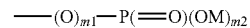

(In the above formula, m1 denotes 0 or 1, m2 denotes 1 or 2, and M denotes a hydrogen atom or an alkali metal atom.)

The above phosphorus polar groups include:
phosphonic acid (salt) group (—P(═O)(OM)$_2$);
phosphinic acid (salt) group (—P(—H)(═O)(OM));
phosphoric acid (salt) group (—O—P(═O)(OM)$_2$); and
phosphorous acid (salt) group (—O—P(—H)(═O)(OM)).

Each of the above functional groups serves as an anionic group in an aqueous solution and affords good adsorption to the surface of the hexagonal ferrite magnetic particles. Adhering a compound having such a functional group to the surface of the hexagonal ferrite magnetic particles can enhance the dispersion of the hexagonal ferrite magnetic particles in the organic solvent-containing magnetic coating material.

The above dispersing agent can contain one or more functional groups of one or more types selected from the group consisting of the above sulfur polar groups, carboxylic acid (salt) groups, and phosphorus polar groups.

Specific examples of embodiments of the compound containing the above sulfur polar groups are cyclic compounds comprising the above sulfur polar groups and non-cyclic-nitrogen-containing compounds comprising the above polar groups.

The cyclic structure contained in a cyclic compound comprising the above sulfur polar groups can be an aliphatic ring, aromatic ring (including an aromatic hydrocarbon ring or an aromatic hetero ring), or a non-aromatic hetero ring, as well as a condensed ring. Examples of the hetero atoms contained in the hetero ring are oxygen atoms, nitrogen atoms, and sulfur atoms. The sulfur polar group can be directly substituted onto the ring structure, or substituted through a divalent linking group such as an alkylene group.

From the perspective of enhancing dispersion, specific desirable examples of the above cyclic compound are the cyclic compounds denoted by formula (I) below:

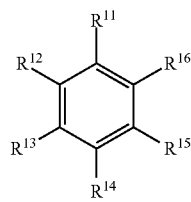

(I)

In formula (I), each of $R^{11}$ to $R^{16}$ independently denotes a hydrogen atom or a substituent, with at least one denoting the above sulfur polar group. It is also possible for two or more of $R^{11}$ to $R^{16}$ to be linked so as to form a cyclic structure. Examples of the cyclic structure that is formed are those given by way of example above. The sulfur polar group is contained in formula (I). The number of instances thereof is at least one, and can be two or more. Incorporating the sulfur polar group can cause adsorption to the surface of the magnetic particles and enhance dispersion.

In formula (I), examples of substituents that can be contained in addition to the sulfur polar group are alkyl groups (such as alkyl groups with 1 to 6 carbon atoms), cycloalkyl groups (such as cyclohexyl groups), hydroxyl groups, alkoxyl groups (such as alkoxyl groups with 1 to 6 carbon atoms), halogen atoms (such as fluorine atoms, chlorine atoms, and bromine atoms), cyano groups, amino groups, nitro groups, acyl groups, and carboxyl groups. The greater the solubility of the dispersing agent in an aqueous solution, the more dispersing agent can adhere to the magnetic particle surface and the greater the dispersion of the magnetic particles. From this perspective, in addition to the sulfur polar group, among $R^{11}$ to $R^{16}$, hydrogen atoms and amino groups are desirable.

In the present invention, the "number of carbon atoms" of a group having a substituent means the number of carbon atoms of the portion without the substituent. In the present invention, the numeric values given before and after the word "to" denote a range including those values as the minimum value and maximum value, respectively.

The above non-cyclic-nitrogen-containing compounds refer to compounds not comprising nitrogen atom(s) in a cyclic structure and include compounds comprising a cyclic structure without nitrogen atom(s). From the perspective of enhancing dispersion, specific desirable examples of non-cyclic-nitrogen-containing compounds having sulfur polar groups are the compounds denoted by formula (II) below:

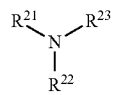

(II)

In formula (II), each of $R^{21}$ to $R^{23}$ independently denotes a hydrogen atom or a substituent, with a least one containing the above sulfur polar group. By containing the above sulfur polar group, the compound can adsorb to the surface of the magnetic particles and enhance dispersion of the magnetic particles. At least one, and permissibly two or more, sulfur polar groups are contained in formula (II).

The substituent containing the above sulfur polar group among $R^{21}$ to $R^{23}$ in formula (II) can be the sulfur polar group itself, or a substituent containing a sulfur polar group as a substituent. From the perspective of enhancing dispersion, it is desirably an alkyl group onto which has been substituted the above sulfur polar group; examples are —$(CH_2)_n$—$(O)_{m1}$—$S(=O)_{m2}$-OM (wherein m1, m2, and M are defined as above). n desirably denotes an integer falling within a range of 1 to 5, preferably an integer falling within a range of 1 to 3, and more preferably, the integer 2 or 3. Of these, substituents containing —$(CH_2)_2SO_3M$ or —$(CH_2)_3SO_3M$ are of greater preference.

As set forth above, the greater the solubility of the dispersing agent in an aqueous solution, the more dispersing agent will adsorb to the surface of the magnetic particles and the more the dispersion of the magnetic particles will be enhanced. From this perspective, a substituted or unsubstituted alkyl group or a substituted or unsubstituted cycloalkyl group is desirable, and an alkyl group or cycloalkyl group onto which has been substituted a hydroxyl and/or alkoxyl group is preferable, as an optional substituent in addition to the sulfur polar group or group containing it among $R^{21}$ to $R^{23}$ in formula (II). As alkyl groups substituted with hydroxyl groups and alkoxyl groups, those substituted with branched alkyl groups are preferred. Further, cyclohexyl groups are preferred as cycloalkyl groups.

As set forth above, incorporating the above sulfur polar group into the dispersing agent can cause it to adsorb to the surface of the magnetic particles and increase dispersion. The greater the proportion of the molecule accounted for by portions other than sulfur polar groups, the smaller the number of molecules of dispersing agent that will adsorb to the surface of the magnetic particles. Thus, from the perspective of obtaining a good dispersion-enhancing effect, the proportion of the molecule accounted for by portions other than the sulfur polar group is desirably not large. From this perspective, the molecular weight of the portion of the dispersing agent excluding the sulfur polar group is desirably equal to or less than 400; by way of example, it can be about equal to or less than about 200. It is desirable from the perspective of the surface-modifying effect for the molecular weight of the portion excluding the sulfur polar group to be equal to or greater than 50.

An example of a specific embodiment of the above compound containing a carboxylic acid (salt) group is a carboxylic acid compound selected from the group consisting of aliphatic compounds and aromatic compounds comprising carboxylic acid (salt) groups. From the perspective of further enhancing the dispersion of the magnetic particles, for compounds in which the number of carboxylic acid (salt) groups contained within the molecule is 1, the number of carbon atoms of the portion excluding the carboxylic acid (salt) group is desirably equal to or more than 1 and equal to or less than 13.

The aromatic ring contained in the aromatic compound having the carboxylic acid (salt) group can be an aromatic hydrocarbon ring, an aromatic hetero ring, or a condensed ring. From the perspective of availability, an aromatic hydrocarbon ring is desirable. Examples of the aromatic ring contained in the aromatic compound are benzene and naphthalene rings. Of these, a benzene ring is desirable. It is also possible for two or more aromatic rings to be joined through a divalent linking group. The carboxylic acid (salt) group can be directly substituted onto the aromatic ring, or substituted through a linking group such as an alkylene group or alkenylene group.

The aliphatic compound having the above carboxylic acid (salt) group can be a cyclic or acyclic aliphatic compound. Examples of aliphatic groups are saturated and unsaturated alkyl, alkylene, and cycloalkylene groups. The number of carbon atoms in the aliphatic group is desirably 1 to 10, preferably 1 to 6. The aliphatic compound is also desirably a nitrogen-containing compound. The nitrogen contained in the nitrogen-containing compound can be in the form of monosubstituted nitrogen, where one of the three bonds of the nitrogen atom is substituted with a substituent other than a hydrogen atom, that is, nitrogen is incorporated as an unsubstituted amino group (—$NH_2$); disubstituted nitrogen, where two of the three bonds of the nitrogen atom are substituted; or trisubstituted nitrogen, where all three bonds are substituted. From the perspective of further enhancing dispersion, the use of a disubstituted or trisubstituted nitrogen-containing compound is desirable.

As set forth above, among the carboxylic acid compounds, in a compound in which the number of carboxylic acid (salt) groups contained within the molecule is one, the number of carbon atoms in the portion excluding the carboxylic acid (salt) group is desirably equal to or more than 1 but equal to or less than 13. In compounds in which the number of carboxylic acid (salt) groups within the molecule is equal to or more than 2, the number of carbon atoms in the portion excluding the carboxylic acid (salt) group can be equal to or more than 1 but equal to or less than 13, or can exceed 13.

The carboxylic acid compound can contain one or more substituents other than the carboxylic acid (salt) group. Specific examples of such substituents are alkyl groups (such as alkyl groups having 1 to 6 carbon atoms), hydroxyl groups, alkoxyl groups (such as alkoxyl groups having 1 to 6 carbon atoms), halogen atoms (such as fluorine atoms, iodine atoms, and bromine atoms), cyano groups, amino groups, nitro groups, and acyl groups.

Examples of desirable substituents among the above are branched alkyl groups and fluorine-containing substituents selected from the group consisting of fluorine atoms and alkyl groups substituted with one or more fluorine atoms, such as trifluoromethyl groups. Of these, good dispersion-enhancing effects can be achieved with an aromatic compound containing, along with the carboxylic acid (salt) group, one or more substituents selected from the group consisting of branched alkyl groups and the fluorine-containing substituents. When the aromatic compound contains an aromatic ring in the form of a benzene ring, the fluorine-containing substituent and branched alkyl group can be substituted at any position, such as the ortho position, meta position, or para position of the carboxylic acid (salt) group. Substitution at the ortho or meta position is desirable from the perspective of further enhancing dispersion.

Further, compounds containing one or more hydroxyl group in addition to the carboxylic acid (salt) group are desirable as a dispersing agents from the perspective of enhancing dispersion.

As set forth above, the dispersing agent can enhance dispersibility by adhering to the surface of the magnetic particle by means of the carboxylic acid (salt) group contained. From the perspective of enhancing dispersion, a compound comprising two or more of these carboxylic acid (salt) groups is desirable as a dispersing agent. The greater the proportion of molecules accounted for by portions other than the carboxylic acid (salt) group, the smaller the number of molecules of dispersing agent that adhere to the surface of the magnetic particle. Thus, from the perspective of achieving a good dispersion-enhancing effect, the proportion accounted for by portions other than the carboxylic acid (salt) group is desirably not large. From this perspective, in the dispersing agent, the molecular weight of portions other than the carboxylic acid (salt) group is desirably equal to or less than 400. By way of example, it is about equal to or less than 200. From the perspective of the dispersion-enhancing effect, it is desirable for the molecular weight of portions other than the carboxylic acid (salt) group to be equal to or more than 20.

Specific embodiments of the compound containing the above-described phosphorus polar group include amine compound containing the above-described phosphorus polar group. The amine compound containing the phosphorus polar group can be a monoamine or a polyamine such as a diamine or triamine. From the perspectives of the dispersion-enhancing effect and availability, examples of amine compounds that are desirable as dispersing agents are the monoamine denoted by formula (A) below and the diamine denoted by formula (B) below.

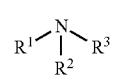

(A)

(In formula (A), each of $R^1$, $R^2$, and $R^3$ independently denotes a substituent, with at least one containing the above monovalent phosphorus polar group.)

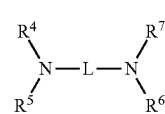

(B)

(In formula (B), each of $R^4$, $R^5$, $R^6$, and $R^7$ independently denotes a substituent, with at least one containing the above monovalent phosphorus polar group, and L denotes a divalent linking group.)

In formula (A), each of $R^1$, $R^2$, and $R^3$ independently denotes a substituent. Among $R^1$, $R^2$, and $R^3$, at least one contains the above monovalent phosphorus polar group. The monovalent substituent can be directly substituted onto the nitrogen atom, or can be indirectly substituted through a linking group. The linking group is desirably an alkylene group, preferably an alkylene group with 1 to 5 carbon atoms, such as a methylene group or ethylene group. Additional substituents are described for formula (I) further below.

In formula (B), each of $R^4$, $R^5$, $R^6$, and $R^7$ independently denotes a substituent. Among $R^4$, $R^5$, $R^6$, and $R^7$, at least one contains the above monovalent phosphorus polar group. The monovalent substituent can be directly substituted onto a nitrogen atom, or can be indirectly substituted through a linking group. The linking group and additional substituents are as set forth above for formula (A). The details of divalent linking group L are also as described for the linking group contained in formula (A) above.

From the perspective of enhancing dispersion, the amine compound containing the phosphorus polar group desirably comprises two or more of the above phosphorus polar groups. Accordingly, in the monoamine denoted by formula (A), two or three of the substituents denoted by $R^1$, $R^2$, and $R^3$ desirably contain the above monovalent phosphorus polar group. In the diamine denoted by formula (B), 2 to 4 of the substituents denoted by $R^4$, $R^5$, $R^6$, and $R^7$ are desirably the above phosphorus polar group.

The aromatic ring contained in the aromatic compound comprising one or more of the phosphorus polar groups can be an aromatic hydrocarbon ring, an aromatic hetero ring, or a condensed ring. From the perspective of availability, an aromatic hydrocarbon ring is desirable. Examples of the aromatic hydrocarbon ring contained in the aromatic compound are benzene and naphthalene rings. Of these, a benzene ring is desirable.

The aliphatic compound comprising one or more of the phosphorus polar groups is a cyclic or acyclic aliphatic compound. Examples of the aliphatic group contained in the aliphatic compound are those containing a saturated or unsaturated linear or branched alkyl group, cycloalkyl group, or the like. Of these, one having a saturated or unsaturated linear or branched alkyl group with 1 to 20 carbon atoms is desirable, and one having a saturated linear alkyl group with 1 to 20 carbon atoms is preferred.

In the above aromatic compounds and aliphatic compounds, the phosphorus polar group can be directly substituted onto the aromatic group or aliphatic group, or can be substituted through a divalent linking group such as an alkylene group. The above aromatic groups and aliphatic groups may optionally comprise substituents in addition to the phosphorus polar group. Specific examples of substituents in addition to the phosphorus polar group are as described for formula (I) further below.

From the perspective of enhancing dispersion, desirable examples of aromatic compounds and aliphatic compounds that comprise one or more of the above phosphorus polar groups are the aromatic compounds and aliphatic compounds denoted by formula (I) below.

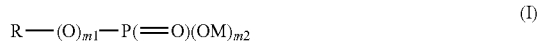

In formula (I), R denotes an aryl group (i.e., aromatic hydrocarbon group) or an alkyl group, and m1, m2, and M are each defined as above.

In formula (I), the aryl group or alkyl group denoted by R may optionally comprise a substituent in addition to the phosphorus polar group. The phosphorus polar group can also be present as a substituent on the aryl group or alkyl group denoted by R. The aromatic compounds and aliphatic compounds denoted by formula (I) each contain at least one of the above phosphorus polar groups, allowing them to adhere to the surface of the magnetic particles and enhance dispersibility of the magnetic particles.

In formula (I), examples of substituents that can be contained in addition to the phosphorus polar group are alkyl groups (such as alkyl groups with 1 to 6 carbon atoms), hydroxyl groups, alkoxyl groups (such as alkoxyl groups with 1 to 6 carbon atoms), halogen atoms (such as fluorine atoms, chlorine atoms, and bromine atoms), cyano groups, amino groups, nitro groups, acyl groups, and carboxylic acid (salt) groups.

The greater the solubility in water-based solvents of the compound employed as the dispersing agent, the greater the amount of the dispersion-agent adsorbed to the magnetic particles and the greater the dispersion-enhancing effect. From this perspective, the aryl group denoted by R is desirably a phenyl group or a naphthyl group, preferably a phenyl group.

In formula (I), examples of alkyl groups denoted by R are saturated and unsaturated linear and branched alkyl groups. The details are as described for the alkyl group that can be contained in the aliphatic compound having the phosphorus polar group set forth above.

As stated above, the dispersing agent is able to adhere to the surface of the magnetic particles and enhance dispersion because it contains the above phosphorus polar group. The greater the proportion of molecules accounted for by portions other than the phosphorus polar group, the smaller the number of molecules of dispersing agent that will adhere to the surface of the magnetic particles. Thus, from the perspective of achieving a good dispersion-enhancing effect, the proportion of molecules accounted for by portions other than the phosphorus polar group is desirably not large. From this perspective, in the dispersing agent, the molecular weight of portions other than the phosphorus polar group is desirably equal to or less than 400. By way of example, it can be about equal to or less than 300, or even about equal to or less than 200. From the perspective of the dispersing-enhancing effect, it is desirable for the molecular weight of portions other than the phosphorus polar group to be equal to or more than 20.

Further examples of specific embodiments of the above compound containing a functional group are the compounds denoted by general formulas (I) and (II) described in Japanese Unexamined Patent Publication (KOKAI) No. 2012-14809, which is expressly incorporated herein by reference in its entirety. The functional groups serving as anionic groups that are described in these publications correspond to the above-described functional group serving as an anionic group in an aqueous solution. Of these, the compound denoted by general formula (I) below that is described in Japanese Unexamined Patent Publication (KOKAI) No. 2012-14809 is desirable:

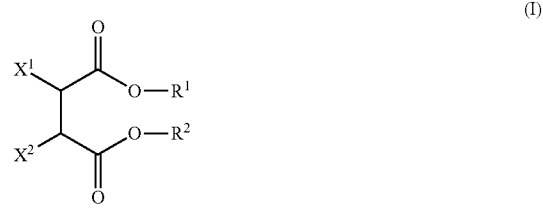

(In general formula (I), each of $R^1$ and $R^2$ independently denotes an alkyl group having 5 to 10 carbon atoms; $X^1$ and $X_2$ denote hydrogen atoms or substituents, with at least $X^1$ or $X^2$ denoting a functional group serving as an anionic group in an aqueous solution.)

For details about the compounds denoted by general formulas (I) and (II) in Japanese Unexamined Patent Publication (KOKAI) No. 2012-14809, reference can be made to the description given in paragraphs [0020] to [0031] of that publication.

The above-described dispersing agents can all be synthesized by known methods and are available as commercial products. The above dispersing agents can be employed, for example, in quantities of 0.1 to 10 weight parts per 100 weight parts of magnetic particles, or in quantities of 0.0001 to 5 weight parts per 100 weight parts of the total weight of the aqueous solution containing hexagonal ferrite particles during or after water washing, either singly or in combinations of two or more. They can be dispersed or stirred by known methods during or after addition of the dispersing agent to the aqueous solution. It is desirable for the dispersing agent to be uniformly adhered to the surface of the magnetic particles. The dispersing agent can be added to the aqueous solution as is, or in the form of a solution prepared by adding the dispersing agent to an aqueous solvent. When adding the dispersing agent in the form of a solution, the concentration of the dispersing agent in the solution is not specifically limited.

The solvent replacement treatment is as set forth above. Those organic solvents that are commonly employed in the manufacturing of particulate magnetic recording media are examples of the organic solvent that is employed in solvent replacement. Specific examples thereof are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane; these may be employed in any ratio. Among them, from the perspectives of the solubility of the binders that are commonly employed in magnetic recording media and adsorption of binder onto the surface of the magnetic particles, the use of an organic solvent containing a ketone (ketone-based organic solvent) is desirable.

These organic solvents need not be 100 percent pure and may contain impurities such as isomers, unreacted materials, by-products, decomposition products, oxides and moisture in addition to the main components. The content of these impurities is preferably equal to or less than 30 weight percent, more preferably equal to or less than 10 weight percent. To improve dispersion properties, a solvent having a somewhat strong polarity is desirable. It is desirable that solvents having a dielectric constant equal to or higher than 15 are comprised equal to or higher than 50 weight percent of the solvent composition. Further, the dissolution parameter is desirably 8 to 11.

The method of manufacturing a magnetic recording medium according to an aspect of the present invention will be described next.

The method of manufacturing a magnetic recording medium according to an aspect of the present invention is a method of manufacturing a magnetic recording medium comprising on a nonmagnetic support a magnetic layer containing ferromagnetic powder and a binder, which comprises forming the magnetic layer using a magnetic coating material containing the hexagonal ferrite magnetic particles according to an aspect of the present invention and an organic solvent, that is, the magnetic coating material according to an aspect of the present invention. This permits manufacturing of the magnetic recording medium according to an aspect of the present invention.

The magnetic layer is desirably formed using a magnetic coating material prepared by the method of manufacturing a magnetic coating material according to an aspect of the present invention as set forth above. The hexagonal ferrite magnetic particles can be present in a highly dispersed state in the magnetic coating material containing the above dispersing agent. Accordingly, using such a magnetic coating material makes it possible to provide a magnetic recording medium having a magnetic layer of good surface smoothness. A magnetic recording medium in which the magnetic layer affords good surface smoothness is suitable for high-density recording. Thus, the magnetic recording medium according to an aspect of the present invention can be used as a magnetic recording medium for high-density recording.

Specific embodiments of the magnetic recording medium and the method of manufacturing it according to an aspect of the present invention will be described below.

Magnetic Layer

The magnetic layer is a layer containing a binder and the hexagonal ferrite magnetic particles according to an aspect of the present invention. Examples of the binder for use in the magnetic layer are: polyurethane resins; polyester resins; polyamide resins; vinyl chloride resins; styrene; acrylonitrile; methyl methacrylate and other copolymerized acrylic resins; nitrocellulose and other cellulose resins; epoxy resins; phenoxy resins; and polyvinyl acetal, polyvinyl butyral, and other polyvinyl alkyral resins. These may be employed singly or in combinations of two or more. Of these, the desirable binders are the polyurethane resins, acrylic resins, cellulose resins, and vinyl chloride resins. These resins may also be employed as binders in the nonmagnetic layer described further below. Reference can be made to paragraphs [0029] to [0031] in Japanese Unexamined Patent Publication (KOKAI) No. 2010-24113, which is expressly incorporated herein by reference in its entirety, for details of the binder. A polyisocyanate curing agent may also be employed with the above resins.

Additives can be added to the magnetic layer as needed. Examples of additives are abrasives, lubricants, dispersing agents, dispersion adjuvants, antifungal agents, antistatic agents, oxidation-inhibiting agents, and carbon black. Commercial products can be suitably selected for use based on the desired properties of the additives. Use of the dispersing agent set forth above as an additive is effective to further enhance dispersion.

Nonmagnetic Layer

Details of the nonmagnetic layer will be described below. In an aspect of the present invention, a nonmagnetic layer comprising nonmagnetic powder and a binder can be formed between the nonmagnetic support and the magnetic layer. Both organic and inorganic substances may be employed as the nonmagnetic powder in the nonmagnetic layer. Carbon black may also be employed. Examples of inorganic substances are metals, metal oxides, metal carbonates, metal sulfates, metal nitrides, metal carbides, and metal sulfides. These nonmagnetic powders are commercially available and can be manufactured by the known methods. Reference can be made to paragraphs [0036] to [0115] in Japanese Unexamined Patent Publication (KOKAI) No. 2010-24113 for details thereof.

Binders, lubricants, dispersing agents, additives, solvents, dispersion methods, and the like suited to the magnetic layer may be adopted to the nonmagnetic layer. In particular, known techniques for the quantity and type of binder resin and the quantity and type of additives and dispersing agents employed in the magnetic layer may be adopted thereto. Carbon black and organic powders can be added to the nonmagnetic layer. Reference can be made to paragraphs [0040] to [0042] in Japanese Unexamined Patent Publication (KOKAI) No. 2010-24113 for details thereof.

Nonmagnetic Support

The magnetic coating material that has been prepared by the above method is coated directly, or through another layer such as a nonmagnetic layer, on the nonmagnetic support. As a result, a magnetic recording medium having the magnetic layer on the nonmagnetic support, or as needed, through another layer such as a nonmagnetic layer can be obtained.

A known film such as biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. The center average roughness, Ra, at a cutoff value of 0.25 mm of the nonmagnetic support suitable for use in an aspect of the present invention desirably ranges from 3 to 10 nm.

Layer Structure

As for the thickness structure of the magnetic recording medium according too an aspect of the present invention, the thickness of the nonmagnetic support desirably ranges from 3 to 80 µm. The thickness of the magnetic layer can be optimized based on the saturation magnetization of the magnetic head employed, the length of the head gap, and the recording signal band, and is normally 10 to 150 nm, desirably 20 to 120 nm, and preferably, 30 to 100 nm. At least one magnetic layer is sufficient. The magnetic layer may be divided into two or more layers having different magnetic characteristics, and a known configuration relating to multilayered magnetic layer may be applied.

The nonmagnetic layer is, for example, 0.1 to 3.0 µm, desirably 0.3 to 2.0 µm, and preferably, 0.5 to 1.5 µm in thickness. The nonmagnetic layer of the magnetic recording medium of an aspect of the present invention can exhibit its effect so long as it is substantially nonmagnetic. It can exhibit the effect of the present invention, and can be deemed to have essentially the same structure as the magnetic recording medium of the present invention, for example, even when impurities are contained or a small quantity of magnetic material is intentionally incorporated. The term "essentially the same" means that the residual magnetic flux density of the nonmagnetic layer is equal to or lower than 10 mT, or the coercive force is equal to or lower than 7.96 kA/m (equal to or lower than 100 Oe), with desirably no residual magnetic flux density or coercive force being present.

Backcoat Layer

A backcoat layer can be provided on the surface of the nonmagnetic support opposite to the surface on which the magnetic layer is provided, in an aspect of the present invention. The backcoat layer desirably comprises carbon black and inorganic powder. The formula of the magnetic layer or nonmagnetic layer can be applied to the binder and various additives for the formation of the backcoat layer. The backcoat layer is preferably equal to or less than 0.9 µm, more preferably 0.1 to 0.7 µm, in thickness.

Manufacturing Steps

The coating liquid for forming the magnetic layer can be prepared by the same method as the method normally used to prepare a magnetic layer-forming coating liquid with the exception that the hexagonal ferrite magnetic particles according to an aspect of the present invention are employed. The coating liquid for forming the magnetic layer is desirably prepared by the method of manufacturing a magnetic coating material according to an aspect of the present invention that has been set forth above.

The process for manufacturing magnetic layer, nonmagnetic layer and backcoat layer coating liquids normally comprises at least a kneading step, a dispersing step, and a mixing step to be carried out, if necessary, before and/or after the kneading and dispersing steps. Each of the individual steps may be divided into two or more stages. All of the starting materials employed in an aspect of the present invention, including the magnetic particle, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. The dispersing agent can be added to the liquid containing the hexagonal ferrite magnetic particles in an organic solvent in the step for preparing the magnetic layer-forming coating liquid. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. Details of the kneading process are described in Japanese Unexamined Patent Publication (KOKAI) Heisei Nos. 1-106338 and 1-79274. The contents of these applications are incorporated herein by reference in their entirety. Further, glass beads and other beads may be employed to disperse the magnetic layer, nonmagnetic layer and backcoat layer coating liquids. Dispersing media with a high specific gravity such as zirconia beads, titania beads, and steel beads are suitable for use. The particle diameter and filling rate of these dispersing media can be optimized for use. A known dispersing device may be employed. Reference can be made to paragraphs [0051] to [0057] in Japanese Unexamined Patent Publication (KOKAI) No. 2010-24113 for details of the method of manufacturing a magnetic recording medium.

EXAMPLES

The present invention will be described in detail below based on specific examples and comparative examples. However, the present invention is not limited to the examples. The terms "percent" given below is a weight percent and the ratio described is a weight ratio.

1. Examples and Comparative Examples Relating to Hexagonal Ferrite Magnetic Particles Examples 1 to 3, Comparative Examples 1 to 3

Procedure 1: Preparation of Micelle Solution

Micelle solutions I and II were prepared by the following methods.

(1) Preparation of Micelle Solution I

To 10.46 g of iron (III) nitrate nonahydrate and 123.7 g of cetyl trimethylammonium bromide were added 207.9 g of pure water, followed by 439.8 g of n-octane and 101.2 g of 1-butanol. The mixture was stirred and dissolved.

(2) Preparation of Micelle Solution II

To 123.7 g of cetyl trimethylammonium bromide were added 178.5 g of 10 percent ammonia water and 47.3 g of pure water, followed by 439.8 g of n-octane and 101.2 g of 1-butanol. The mixture was stirred and dissolved.

Procedure 2: Hydrolysis of Glass Component Precursor

While mixing and stirring micelle solutions I and II obtained in Procedure 1, tetraethoxysilane (TEOS) was added in the quantities given in Table 1 to the mixed solution. Stirring was continued in the same manner for about a day. That caused the TEOS to hydrolyze and the silica to adhere to the surface of the iron hydroxide particles that precipitated in the mixed solution.

Procedure 3: Washing

The solution obtained in Procedure 2 was charged to a separating funnel, 200 mL of a 1:1 mixed solution of pure water and ethanol was added, and the mixture was left standing to allow the separation of a reddish-brown portion from the remaining portions. The portions other than the reddish-brown portion were discarded. This operation was repeated three times, and the remaining liquid was placed in a centrifuge and centrifuged.

The precipitate obtained by the above processing was recovered. The recovered precipitate was redispersed in a mixed solution of chloroform and ethanol and centrifuged to obtain a precipitate, which was recovered.

Procedure 4: Alkaline Earth Metal Salt Adhesion Treatment

The precipitate obtained in Procedure 3 was separated into portions containing 3.7 mmol of iron, 40 g of pure water was added, and the precipitate was redispersed.

A 5 percent barium nitrate or strontium nitrate aqueous solution was added to the dispersion obtained so that the quantity of Ba or Sr was triple the quantity of the stoichiometric composition of the hexagonal ferrite. The mixture was stirred, after which 1.3 mL of 5 N NaOH or 0.9 mL of 10 percent ammonia water was added and the mixture was stirred. Subsequently, 17.6 mL of a 5 percent sodium carbonate aqueous solution was added and the mixture was stirred overnight. The stirred aqueous solution was centrifuged, and the precipitate was washed and air dried.

The above processing yielded particles in which silica and barium carbonate or strontium carbonate were adhered to the surface of iron hydroxide particles.

Procedure 5: Calcination

The precipitate obtained in Procedure 4 was pulverized in a mortar and then subjected to a heat treatment for 2 minutes at an internal furnace temperature of 800° C. while feeding 1 L/min of air in an image furnace made by ULVAC-Riko.

Procedure 6: Removing the Glass Component

The calcined product (heat-treated powder) obtained in Procedure 5 was stirred for 24 hours in a 3 mol/L NaOH aqueous solution to remove the silica from the particle surface. Next, centrifugation was conducted. The precipitate was recovered, redispersed in pure water, and centrifuged to wash it. Subsequently, the precipitate was air dried.

Comparative Example 4

The TEOS indicated in Table 1 was added in Procedure 2 and Procedure 3 was carried out, after which the precipitate was dried and pulverized in a mortar.

Subsequently, a heat treatment (calcination) was conducted for 2 minutes at an internal furnace temperature of 800° C. while feeding 1 L/min of air in an image furnace made by ULVAC-Riko.

The calcined product (heat-treated powder) obtained was stirred for 24 hours in a 3 mol/L NaOH aqueous solution to remove the silica from the particle surface. Next, centrifugation was conducted. The precipitate was recovered, redispersed in pure water, and centrifuged to wash it. Observation of the particles obtained by a transmission electron microscope revealed a diameter of about 8 nm.

The precipitate obtained was subjected to the processing of Procedure 4 and subsequent processing.

Evaluation Methods (1) X-Ray Diffraction Analysis

Particle X-ray diffraction analysis of the particles obtained in Procedure 6 was conducted with an X' Pert PRO (line source: CuKα lines, voltage 45 kV, current 40 mA) made by PANalytical.

(2) Magnetic Characteristics

The magnetic characteristics of particles in which hexagonal ferrite was detected as the principal component in (1) above were measured with a vibrating superconducting magnetometer VSM (external magnetic field 3 T) made by Tamagawa Seisakusho.

(3) Particle Size Measurement

The size of the particles in which barium ferrite was detected as the principal component in (1) above was measured by the above-described method by a transmission electron microscope.

The results of the above are given in Table 1.

TABLE 1

|  | TEOS mol/ Fe mol | Alkaline earth metal salt added in Procedure 4 | Alkali Added in Procedure 4 | Principal component detected in X-ray diffraction | Particle size (nm) | Coercive force | Saturation magnetization $(A \cdot m^2/kg)$ |
|---|---|---|---|---|---|---|---|
| Ex. 1 | 0.28 | Barium nitrate | NaOH | Hexagonal barium ferrite | 20 | 255 kA/m (3200 Oe) | 30 |
| Ex. 2 | 0.28 | Strontium nitrate | NaOH | Hexagonal strontium ferrite | 14 | 175 kA/m (2200 Oe) | 24 |
| Ex. 3 | 0.28 | Strontium nitrate | Ammonia water | Hexagonal strontium ferrite | 14 | 227 kA/m (2850 Oe) | 26 |
| Comp. Ex. 1 | 0 | Barium nitrate | NaOH | Hexagonal barium ferrite | 100 | 414 kA/m (5200 Oe) | 53 |

TABLE 1-continued

|  | TEOS mol/ Fe mol | Alkaline earth metal salt added in Procedure 4 | Alkali Added in Procedure 4 | Principal component detected in X-ray diffraction | Particle size (nm) | Coercive force | Saturation magnetization (A · m²/kg) |
|---|---|---|---|---|---|---|---|
| Comp. Ex. 2 | 0.56 | Barium nitrate | NaOH | Hematite | — | — | — |
| Comp. Ex. 3 | 1.12 | Barium nitrate | NaOH | Hematite | — | — | — |
| Comp. Ex. 4 | 1.12 | Barium nitrate | NaOH | Hexagonal barium ferrite | 100 | 263 kA/m (3300 Oe) | 30 |

Evaluation Results

As indicated in Table 1, Examples 1 to 3 yielded microparticulate barium ferrite magnetic particles.

By contrast, Comparative Example 1 is an example in which an alkaline earth metal salt was adhered to iron salt particles without adhesion of a glass component and the resulting particles were calcined (converted to ferrite).

Comparative Example 4 is an example in which the glass component that had been adhered to the iron salt particles was removed, an alkaline earth metal salt was then adhered, and calcination (conversion to ferrite) was conducted.

In both Comparative Examples 1 and 4, the particles sintered during calcination, precluding the obtaining of microparticulate barium ferrite magnetic particles. In Comparative Example 4, the particle size range observed was 20 nm to 200 nm, revealing great variation in the particle size distribution. In Comparative Example 4, before the adhesion of the alkaline earth metal salt, the glass component was adhered to the iron salt particles and calcination was conducted. The diameter of the particles obtained following calcination was about 8 nm, revealing microparticles. That confirmed that the glass component had an effect in preventing sintering.

In Comparative Examples 2 and 3, hematite was detected as the principal component in the particles following calcination. This was thought to have occurred because the alkaline earth metal salt was adhered and calcination was conducted with the iron salt particles completely covered by the glass component, causing the formation of hematite to take place preferentially over the formation of barium ferrite.

2. Examples and Comparative Examples of the Magnetic Coating Material

Example 4

(1) A 1 g quantity of the calcined product (heat treated powder) obtained by procedures 1 to 5 in Example 1 was placed in 25 cc of a 5 N aqueous solution of sodium hydroxide, ultrasonically processed for 4 hours while being subjected to ultrasonic wave at a temperature of 70° C., and then stirred for a day and a night.

Subsequently, water washing and centrifugation were repeated and washing was conducted until the supernatant dropped below pH 8.

(2) To the aqueous solution following washing was added 20 cc of a 1 percent aqueous solution of sodium sulfosuccinate (AOT). The mixture was exposed to ultrasonic wave and centrifuged. The supernatant was discarded.

Subsequently, 20 cc of methyl ethyl ketone (MEK) was added and the mixture was exposed to ultrasonic wave and centrifuged. This process was repeated twice.

(3) Next, with the MEK still present, to a quantity of solution weighed out so that the quantity of hexagonal ferrite magnetic particles was 250 mg were added 2.5 g of dispersion beads (YTZ balls, φ 0.05 mm, made by Nikkato), 15 mg of AOT, 35 mg of polyurethane resin, 397 mg of MEK, and 265 mg of cyclohexanone. A Mix-EVR small desk-top vibrator made by Taitec was then employed to conduct dispersion processing for 21 hours in the form of 2,500 r/min horizontal eccentric vibration, yielding a dispersion for use in measuring the average particle diameter in liquid.

(4) Separately from (3) above, with the MEK still present, to a quantity of solution weighed out so that the quantity of hexagonal ferrite magnetic particles was 250 mg were added 2.5 mg of carbon black (particle size: 20 nm), 15 mg of AOT, 35 mg of polyurethane resin, 397 mg of MEK, and 265 mg of cyclohexanone. The same dispersion processing was conducted as in 3. above, yielding a dispersion for use in preparing a magnetic sheet.

The dispersion obtained was coated with a 1 mil doctor blade on a PEN base made by Teijin and left standing for 30 minutes at room temperature to dry to prepare a coating.

Example 5

With the exception that the magnetic particles of Example 4 were dried before adding the MEK in (2) above, the same operation was conducted as in Example 4.

Example 6

(1) One gram of the calcined product (heat treated powder) obtained by procedures 1 to 5 in Example 1 was placed in 25 cc of a 5 N aqueous solution of sodium hydroxide, treated ultrasonically for 4 hours while being exposed to ultrasonic wave at 70° C., and then stirred for a day and a night.

Subsequently, water washing and centrifugation were repeated and washing was conducted until the supernatant dropped to below pH 8. The magnetic particles were then dried.

(2) A 250 mg quantity of dry powder was weighed out and added to 20 cc of a 1 percent aqueous solution of di(2-ethylhexyl)sodium sulfosuccinate (AOT). The mixture was exposed to ultrasonic wave and then centrifuged. The supernatant was discarded.

Subsequently, 20 cc of methyl ethyl ketone (MEK) was added. The mixture was exposed to ultrasonic wave and then centrifuged, and this process was repeated twice.

(3) Subsequently, the same operation was conducted as in Example 4, yielding a dispersion.

Example 7

With the exception that no AOT was employed in (2) in Example 6 and no AOT was added during preparation of the dispersion, the same procedure was conducted as in Example 6, yielding a dispersion.

Evaluation Methods (1) Measurement of average particle diameter in liquid

The dispersions for measuring the average diameter of particle in liquid that had been obtained in Examples 4 to 7 were diluted to a solid fraction concentration of 0.2 weight percent with a mixed solvent comprising cyclohexanone and methyl ethyl ketone in a volumetric ratio of methyl ethyl ketone:cyclohexanone=6:4.

Table 2 gives the arithmetic average particle diameter in the diluted liquid as measured with an LB-500 dynamic light-scattering particle size measuring apparatus made by HORIBA. The smaller the arithmetic average particle diameter that was measured, the better the dispersion without aggregation of the magnetic particles that was indicated.

(2) Coercive Force Measurement

The coercive force of the above coating film was evaluated under conditions of an applied field of 3,184 kA/m (40 kOe) with a vibrating superconducting magnetometer (VSM) made by Tamagawa Seisakusho.

(3) Measurement of Coating Film Ra

The surface roughness of the coating films prepared in Examples 4 to 7 was measured by the following method.

The surface roughness of the above coating films was measured at a scan length of 5 μm by the scanning white light interference method with a ZYGO Newview 5022 general-purpose three-dimensional surface profile analyzer made by ZYGO. The objective lens was 20-fold, the intermediate lens was 1.0-fold, and the measurement viewfield was 260 μm×350 μm. The measured surface was filter-processed with an HPF: 1.65 μm and LPF: 50 μm filter to obtain the value of the centerline average surface roughness Ra.

The results of the above are given in Table 2.

TABLE 2

| | Hc | Average particle diameter in liquid (nm) | Coating film Ra (nm) |
|---|---|---|---|
| Ex. 4 | 271 kA/m (3400 Oe) | 14 | 3.0 |
| Ex. 5 | 267 kA/m (3350 Oe) | 18 | 3.8 |
| Ex. 6 | 266 kA/m(3340 Oe) | 23 | 4.3 |
| Ex. 7 | 274 kA/m(3440 Oe) | 81 | 6.0 |

Evaluation Results

Based on the results given in Table 2, it was possible to determine that using the above dispersing agent made it possible to achieve a state of a high degree of dispersion of hexagonal ferrite magnetic particles in the magnetic coating material, and to achieve a magnetic coating material that permitted the formation of a coating film with good surface smoothness. Using the magnetic coating material thus obtained made it possible to form a magnetic layer in which the microparticulate hexagonal ferrite magnetic particles were dispersed to a high degree, thereby making it possible to obtain a magnetic recording medium that was suited to high-density recording.

In Examples 4 to 6 employing dispersing agents, the reason that Example 3 exhibited the best dispersion results was thought to be that solvent replacement was conducted without a drying treatment. In a comparison of Examples 5 and 6, the reason why Example 5 exhibited better dispersion results was thought to be that treatment with the dispersing agent was conducted before the drying treatment.

The present invention is useful in the field

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing hexagonal ferrite magnetic particles, which comprises:
providing hexagonal ferrite magnetic particles by conducting calcination of particles comprising an iron salt and an alkaline earth metal salt to cause fertilization;
and further comprises:
preparing the particles comprising an iron salt and an alkaline earth metal salt by adhering a glass component which is a hydrolysate of a silicon compound, followed by the alkaline earth metal salt, to the iron salt;
conducting calcination of the particles prepared to form a calcined product in which hexagonal ferrite is detected as a principal component in X-ray diffraction analysis, and
removing the glass component from a surface of the calcined product.

2. The method of manufacturing hexagonal ferrite magnetic particles according to claim 1, wherein the silicon compound is an alkoxysilane.

3. The method of manufacturing hexagonal ferrite magnetic particles according to claim 1, which further comprises preparing the iron salt by a reverse micelle method.

4. The method of manufacturing hexagonal ferrite magnetic particles according to claim 1, which comprises admixing a precursor of the glass component with a solution comprising the iron salt to cause the glass component, in the form of a hydrolysate of the precursor, to adhere to the iron salt.

5. A method of manufacturing hexagonal ferrite magnetic particles, which comprises:
providing hexagonal ferrite magnetic particles by conducting calcination of particles comprising an iron salt and an alkaline earth metal salt to cause fertilization;
and further comprises:

preparing the particles comprising an iron salt and an alkaline earth metal salt by adhering a glass component which is a hydrolysate of a silicon compound, followed by the alkaline earth metal salt, to the iron salt; and conducting calcination of the particles prepared to form a calcined product in which hexagonal ferrite is detected as a principal component in X-ray diffraction analysis, wherein a precursor of the glass component is admixed with a solution comprising the iron salt to cause the glass component, in the form of a hydrolysate of the precursor, to adhere to the iron salt, and the precursor is added in a quantity ranging from 0.05 to 0.4 mole per 1 mole of iron present in the solution.

6. The method of manufacturing hexagonal ferrite magnetic particles according to claim 1, which comprises admixing a precursor of the alkaline earth metal salt and an additional component for converting the precursor to the alkaline earth metal salt, with a solution comprising a product obtained by adhering the glass component to the iron salt, to adhere the alkaline earth metal salt to the product.

7. The method of manufacturing hexagonal ferrite magnetic particles according to claim 6, wherein ammonia water is added together with the precursor of the alkaline earth metal salt and the additional component.

8. The method of manufacturing hexagonal ferrite magnetic particles according to claim 2, which comprises admixing a precursor of the glass component with a solution comprising the iron salt to cause the glass component, in the form of a hydrolysate of the precursor, to adhere to the iron salt.

9. A method of manufacturing hexagonal ferrite magnetic particles, which comprises:

providing hexagonal ferrite magnetic particles by conducting calcination of particles comprising an iron salt and an alkaline earth metal salt to cause fertilization; and further comprises:

preparing the particles comprising an iron salt and an alkaline earth metal salt by adhering a glass component which is a hydrolysate of a silicon compound, followed by the alkaline earth metal salt, to the iron salt; and conducting calcination of the particles prepared to form a calcined product in which hexagonal ferrite is detected as a principal component in X-ray diffraction analysis, wherein the silicon compound is an alkoxysilane, wherein a precursor of the glass component is admixed with a solution comprising the iron salt to cause the glass component, in the form of a hydrolysate of the precursor, to adhere to the iron salt, and the precursor is added in a quantity ranging from 0.05 to 0.4 mole per 1 mole of iron present in the solution.

10. The method of manufacturing hexagonal ferrite magnetic particles according to claim 2, which comprises admixing a precursor of the alkaline earth metal salt and an additional component for converting the precursor to the alkaline earth metal salt, with a solution comprising a product obtained by adhering the glass component to the iron salt, to adhere the alkaline earth metal salt to the product.

11. The method of manufacturing hexagonal ferrite magnetic particles according to claim 10, wherein ammonia water is added together with the precursor of the alkaline earth metal salt and the additional component.

12. The method of manufacturing hexagonal ferrite magnetic particles according to claim 1, wherein the iron salt is iron hydroxide and the alkaline earth metal salt is carbonate of an alkaline earth metal.

13. The method of manufacturing hexagonal ferrite magnetic particles according to claim 1, wherein the glass component is removed by dissolution with an alkali.

* * * * *